(12) United States Patent
Waplington

(10) Patent No.: US 12,261,904 B2
(45) Date of Patent: Mar. 25, 2025

(54) NESTED REQUEST-RESPONSE PROTOCOL NETWORK COMMUNICATIONS

(71) Applicant: ServiceNow, Inc., Santa Clara, CA (US)

(72) Inventor: Brian James Waplington, San Diego, CA (US)

(73) Assignee: ServiceNow, Inc., Santa Clara, CA (US)

( * ) Notice: Subject to any disclaimer, the term of this patent is extended or adjusted under 35 U.S.C. 154(b) by 205 days.

(21) Appl. No.: 17/579,964

(22) Filed: Jan. 20, 2022

(65) Prior Publication Data

US 2023/0269290 A1  Aug. 24, 2023

(51) Int. Cl.
*H04L 67/10* (2022.01)
*G06F 9/48* (2006.01)
(Continued)

(52) U.S. Cl.
CPC ............ *H04L 67/10* (2013.01); *G06F 9/4843* (2013.01); *H04L 41/0803* (2013.01); *G06F 8/65* (2013.01)

(58) Field of Classification Search
CPC ..... H04L 67/10; H04L 41/0803; H04L 67/34; H04L 41/082; H04L 41/069;
(Continued)

(56) References Cited

U.S. PATENT DOCUMENTS 4,941,084 A  7/1990 Terada et al.
5,185,860 A  2/1993 Wu
(Continued)

FOREIGN PATENT DOCUMENTS

EP  0433979  6/1991
EP  1607824  12/2005
(Continued)

OTHER PUBLICATIONS

B. Cheng, S. Zhao, J. Qian, Z. Zhai and J. Chen, "Lightweight Service Mashup Middleware With REST Style Architecture for IoT Applications," in IEEE Transactions on Network and Service Management, vol. 15, No. 3, pp. 1063-1075, Sep. 2018, doi: 10.1109/TNSM.2018.2827933 (abstract only submitted).
(Continued)

*Primary Examiner* — Greg C Bengzon
(74) *Attorney, Agent, or Firm* — McDonnell Boehnen Hulbert & Berghoff LLP

(57) ABSTRACT

A controller computing device may include one or more processors and memory containing controller data representing controller computing device capabilities. The one or more processors may be configured to transmit on a first instance of a request-response protocol, a controller request, including the controller data, to an agent computing device. The controller computing device may then receive, from the agent computing device, an agent request on a second instance of the request-response protocol. The agent request may include agent data representing agent computing device capabilities. The controller computing device may store the agent data in the memory, and transmit on the second instance of the request-response protocol, to the agent computing device, a controller response acknowledging receipt of the agent request. The controller computing device may then receive on the first instance of the request-response protocol from the agent computing device, an agent response acknowledging receipt of the controller request.

20 Claims, 10 Drawing Sheets

(51) Int. Cl.
*H04L 41/0803* (2022.01)
*G06F 8/65* (2018.01)

(58) Field of Classification Search
CPC . H04L 43/0817; H04L 63/10; H04L 41/0233; H04L 41/052; H04L 41/0873; H04L 41/0895; H04L 41/40; H04L 43/16; H04L 67/12; H04L 41/0816; H04L 41/12; H04L 43/08; H04L 63/0428; H04L 63/123; H04L 63/126; H04L 67/125; H04L 67/303; H04L 67/51; H04L 67/561; H04L 12/2803; H04L 41/042; H04L 41/0806; H04L 41/0823; H04L 41/085; H04L 41/0859; H04L 41/0869; H04L 41/0886; H04L 41/142; H04L 41/145; H04L 41/16; H04L 41/20; H04L 41/22; H04L 43/062; H04L 43/065; H04L 43/10; H04L 43/103; H04L 47/70; H04L 63/0227; H04L 63/08; H04L 63/1433; H04L 67/01; H04L 67/04; H04L 67/06; H04L 67/1001; H04L 67/141; H04L 67/306; H04L 67/52; H04L 67/535; H04L 67/55; H04L 67/566; H04L 67/568; H04L 67/60; H04L 69/40; H04L 9/0643; H04L 9/3236; H04L 41/0853; H04L 41/0894; H04L 41/0893; H04L 41/5058; H04L 41/5045; H04L 41/5048; H04L 41/5051; H04L 41/5054; G06F 9/4843; G06F 8/65; G06F 8/658; G06F 8/71; G06F 8/61; G06F 21/57; G06F 11/302; G06F 21/572; G06F 8/60; G06F 8/654; G06F 8/656; G06F 8/70; G06F 11/0751; G06F 11/0793; G06F 11/3006; G06F 11/3051; G06F 11/3409; G06F 16/951; G06F 21/64; G06F 2201/81; G06F 2201/865; G06F 3/04842; G06F 8/36; G06F 9/44526; G06F 9/5005; G06F 9/5072; G06F 9/54; G06F 11/0721; G06F 11/0766; G06F 11/079; G06F 11/1433; G06F 11/1629; G06F 11/3055; G06F 11/3079; G06F 11/3096; G06F 11/34; G06F 11/3428; G06F 11/3466; G06F 11/3612; G06F 12/0284; G06F 12/0646; G06F 12/08; G06F 13/1642; G06F 15/173; G06F 15/177; G06F 16/188; G06F 16/24578; G06F 2009/45591; G06F 21/31; G06F 21/575; G06F 21/577; G06F 21/602; G06F 21/725; G06F 2201/805; G06F 2201/86; G06F 2201/875; G06F 2209/482; G06F 2209/5013; G06F 2209/541; G06F 2212/1008; G06F 2212/1044; G06F 2212/1056; G06F 2221/033; G06F 3/167; G06F 8/31; G06F 8/311; G06F 8/34; G06F 8/433; G06F 8/66; G06F 8/75; G06F 9/3009; G06F 9/3836; G06F 9/4401; G06F 9/442; G06F 9/445; G06F 9/44505; G06F 9/4451; G06F 9/44521; G06F 9/44536; G06F 9/4494; G06F 9/45558; G06F 9/4881; G06F 9/52; G06F 9/526; G06F 9/542; G06F 8/76; H04W 12/068; H04W 12/033; H04W 12/04; H04W 12/06; H04W 12/069; H04W 12/10; H04W 12/106; H04W 12/35; H04W 12/71; H04W 24/02; H04W 4/02; H04W 4/024; H04W 4/18; H04W 4/21; H04W 4/38; H04W 4/50; H04W 4/60; H04W 4/70; H04W 76/12; G06Q 10/06; G06Q 10/0631

See application file for complete search history.

(56) References Cited

U.S. PATENT DOCUMENTS

| | | |
|---|---|---|
| 5,237,518 A | 8/1993 | Sztipanovits et al. |
| 5,261,097 A | 11/1993 | Saxon |
| 5,265,252 A | 11/1993 | Rawson, III et al. |
| 5,367,685 A | 11/1994 | Gosling |
| 5,390,297 A | 2/1995 | Barber et al. |
| 5,442,791 A | 8/1995 | Wrabetz et al. |
| 5,452,415 A | 9/1995 | Hotka |
| 5,522,042 A | 5/1996 | Fee et al. |
| 5,533,116 A | 7/1996 | Vesterinen |
| 5,655,081 A | 8/1997 | Bonnell et al. |
| 5,659,736 A | 8/1997 | Hasegawa et al. |
| 5,671,412 A | 9/1997 | Christiano |
| 5,696,701 A | 12/1997 | Burgess et al. |
| 5,715,463 A | 2/1998 | Merkin |
| 5,745,879 A | 4/1998 | Wyman |
| 5,761,502 A | 6/1998 | Jacobs |
| 5,764,913 A | 6/1998 | Jancke et al. |
| 5,887,139 A | 3/1999 | Madison, Jr. et al. |
| 5,909,217 A | 6/1999 | Bereiter |
| 5,937,165 A | 8/1999 | Schwaller et al. |
| 5,949,976 A | 9/1999 | Chappelle |
| 5,978,594 A | 11/1999 | Bonnell et al. |
| 6,021,437 A | 2/2000 | Chen et al. |
| 6,041,347 A | 3/2000 | Harsham et al. |
| 6,088,717 A | 7/2000 | Reed et al. |
| 6,101,500 A | 8/2000 | Lau |
| 6,128,016 A | 10/2000 | Coelho et al. |
| 6,131,118 A | 10/2000 | Stupek, Jr. et al. |
| 6,134,581 A | 10/2000 | Ismael et al. |
| 6,138,122 A | 10/2000 | Smith et al. |
| 6,148,335 A | 11/2000 | Haggard et al. |
| 6,166,732 A | 12/2000 | Mitchell et al. |
| 6,167,448 A | 12/2000 | Hemphill et al. |
| 6,175,866 B1 | 1/2001 | Holloway et al. |
| 6,175,878 B1 | 1/2001 | Seaman et al. |
| 6,260,050 B1 | 7/2001 | Yost et al. |
| 6,263,457 B1 | 7/2001 | Anderson et al. |
| 6,272,150 B1 | 8/2001 | Hrastar et al. |
| 6,336,138 B1 | 1/2002 | Caswell et al. |
| 6,363,421 B2 | 3/2002 | Barker et al. |
| 6,393,386 B1 | 5/2002 | Zager et al. |
| 6,397,245 B1 | 5/2002 | Johnson, II et al. |
| 6,434,626 B1 | 8/2002 | Prakash et al. |
| 6,438,592 B1 | 8/2002 | Killian |
| 6,456,306 B1 | 9/2002 | Chin et al. |
| 6,466,932 B1 | 10/2002 | Dennis et al. |
| 6,487,590 B1 | 11/2002 | Foley et al. |
| 6,505,248 B1 | 1/2003 | Casper et al. |
| 6,526,442 B1 | 2/2003 | Stupek, Jr. et al. |
| 6,621,823 B1 | 9/2003 | Mellquist et al. |
| 6,707,795 B1 | 3/2004 | Noorhosseini et al. |
| 6,742,015 B1 | 5/2004 | Bowman-Amuah |
| 6,763,380 B1 | 7/2004 | Mayton et al. |
| 6,816,898 B1 | 11/2004 | Scarpelli et al. |
| 6,895,586 B1 | 5/2005 | Brasher et al. |
| 6,948,175 B1 | 9/2005 | Fong et al. |
| 6,985,901 B1 | 1/2006 | Sachse et al. |
| 7,003,564 B2 | 2/2006 | Greuel et al. |
| 7,028,228 B1 | 4/2006 | Lovy et al. |
| 7,043,537 B1 | 5/2006 | Pratt |
| 7,043,661 B2 | 5/2006 | Valadarsky et al. |
| 7,062,683 B2 | 6/2006 | Warpenburg et al. |
| 7,096,459 B2 | 8/2006 | Keller et al. |
| 7,146,574 B2 | 12/2006 | Goldthwaite et al. |
| 7,197,466 B1 | 3/2007 | Peterson et al. |
| 7,215,360 B2 | 5/2007 | Gupta |
| 7,216,304 B1 | 5/2007 | Gourdol et al. |
| 7,222,147 B1 | 5/2007 | Black et al. |
| 7,281,170 B2 | 10/2007 | Taylor et al. |

(56) References Cited

U.S. PATENT DOCUMENTS

| | | |
|---|---|---|
| 7,412,502 B2 | 8/2008 | Fearn et al. |
| 7,505,872 B2 | 3/2009 | Keller et al. |
| 7,593,013 B2 | 9/2009 | Agutter et al. |
| 7,596,716 B2 | 9/2009 | Frost et al. |
| 7,617,073 B2 | 11/2009 | Trinon et al. |
| 7,660,731 B2 | 2/2010 | Chaddha et al. |
| 7,676,294 B2 | 3/2010 | Baier et al. |
| 7,676,437 B2 | 3/2010 | Satkunanathan et al. |
| 7,840,490 B1 | 11/2010 | Sellers et al. |
| 7,877,783 B1 | 1/2011 | Cline et al. |
| 7,890,869 B1 | 2/2011 | Mayer et al. |
| 7,966,398 B2 | 6/2011 | Wiles, Jr. |
| 8,060,396 B1 | 11/2011 | Bessler et al. |
| 8,079,037 B2* | 12/2011 | Lui .................. G06F 11/3636 719/310 |
| 8,196,210 B2 | 6/2012 | Sterin |
| 8,321,948 B2 | 11/2012 | Robinson et al. |
| 8,407,669 B2 | 3/2013 | Yee et al. |
| 8,554,750 B2 | 10/2013 | Rangarajan et al. |
| 8,595,647 B2 | 11/2013 | Sabin et al. |
| 8,620,818 B2 | 12/2013 | Hughes et al. |
| 8,646,093 B2 | 2/2014 | Myers et al. |
| 8,674,992 B2 | 3/2014 | Poston et al. |
| 8,725,647 B2 | 5/2014 | Disciascio et al. |
| 8,726,264 B1* | 5/2014 | Allen ...................... G06F 8/60 717/171 |
| 8,886,916 B2* | 11/2014 | Archer ...................... G06F 9/54 709/201 |
| 9,053,460 B2 | 6/2015 | Gilbert et al. |
| 9,762,676 B2* | 9/2017 | Olcese .................. H04W 12/06 |
| 10,334,056 B2* | 6/2019 | Olcese .................. H04L 9/3213 |
| 10,673,963 B1 | 6/2020 | Feiguine et al. |
| 10,749,943 B1 | 8/2020 | Feiguine et al. |
| 10,771,344 B2 | 9/2020 | Bitterfeld et al. |
| 10,824,650 B2 | 11/2020 | Bar Oz et al. |
| 10,944,654 B2 | 3/2021 | Rimar et al. |
| 11,044,139 B1* | 6/2021 | Farber .................. H04L 41/0266 |
| 11,089,115 B2 | 8/2021 | Garty et al. |
| 11,095,506 B1 | 8/2021 | Erblat et al. |
| 11,366,654 B2* | 6/2022 | Amiga ...................... G06F 8/65 |
| 2002/0116340 A1 | 8/2002 | Hellberg et al. |
| 2002/0133584 A1 | 9/2002 | Greuel et al. |
| 2002/0158969 A1 | 10/2002 | Gupta |
| 2003/0118087 A1 | 6/2003 | Goldthwaite et al. |
| 2003/0200293 A1 | 10/2003 | Fearn et al. |
| 2005/0015217 A1 | 1/2005 | Weidl et al. |
| 2005/0091356 A1 | 4/2005 | Izzo |
| 2006/0026453 A1 | 2/2006 | Frost et al. |
| 2006/0095461 A1 | 5/2006 | Raymond |
| 2006/0179058 A1 | 8/2006 | Bram et al. |
| 2006/0293942 A1 | 12/2006 | Chaddha et al. |
| 2007/0033279 A1 | 2/2007 | Battat et al. |
| 2007/0180448 A1* | 8/2007 | Low ...................... G06F 3/1415 718/1 |
| 2007/0188494 A1 | 8/2007 | Agutter et al. |
| 2007/0288389 A1 | 12/2007 | Vaughan et al. |
| 2008/0133289 A1 | 6/2008 | Armour et al. |
| 2008/0148253 A1 | 6/2008 | Badwe et al. |
| 2008/0319779 A1 | 12/2008 | Hughes et al. |
| 2009/0088875 A1 | 4/2009 | Baier et al. |
| 2009/0228984 A1 | 9/2009 | Sterin |
| 2010/0110932 A1 | 5/2010 | Doran et al. |
| 2011/0138403 A1* | 6/2011 | Meijer .................. G06F 9/4486 719/328 |
| 2012/0284512 A1 | 11/2012 | Agarwal |
| 2013/0339498 A1* | 12/2013 | Johnson ................ H04L 67/104 709/221 |
| 2014/0112339 A1* | 4/2014 | Safranek ............ G06F 12/0815 370/389 |
| 2014/0114928 A1* | 4/2014 | Beers .................... G06F 13/382 707/687 |
| 2016/0094664 A1* | 3/2016 | Olcese ...................... G06F 8/31 709/225 |
| 2016/0291942 A1* | 10/2016 | Hutchison ................ G06F 8/41 |
| 2016/0321064 A1* | 11/2016 | Sankaranarasimhan ..................... H04L 67/34 |
| 2017/0034015 A1 | 2/2017 | Li |
| 2017/0126509 A1* | 5/2017 | Jones-McFadden ........................ H04W 12/068 |
| 2017/0134514 A1* | 5/2017 | Greifeneder .......... H04L 67/535 |
| 2017/0168808 A1* | 6/2017 | Kakei ...................... G06F 8/71 |
| 2018/0107600 A1* | 4/2018 | Dawson ................ G06F 13/366 |
| 2018/0123940 A1 | 5/2018 | Rimar et al. |
| 2018/0183880 A1* | 6/2018 | Olcese .................. H04L 9/3228 |
| 2018/0260374 A1* | 9/2018 | Sobhy Deraz .......... G06F 17/10 |
| 2019/0104398 A1 | 4/2019 | Owen et al. |
| 2019/0171604 A1* | 6/2019 | Brewer ................ G06F 13/4022 |
| 2019/0205773 A1* | 7/2019 | Ackerman ............ G06N 5/022 |
| 2019/0220331 A1* | 7/2019 | Duggal .................. G06F 9/5072 |
| 2020/0004598 A1* | 1/2020 | Brebner ................ G06F 9/5055 |
| 2020/0004759 A1* | 1/2020 | Brebner .................... G06F 8/10 |
| 2020/0007615 A1* | 1/2020 | Brebner .................. G06F 9/542 |
| 2020/0050689 A1 | 2/2020 | Tal et al. |
| 2020/0153699 A1* | 5/2020 | Bai ........................ H04L 67/10 |
| 2020/0204443 A1 | 6/2020 | Bar Oz et al. |
| 2021/0141351 A1* | 5/2021 | Yang ...................... H04L 67/12 |
| 2021/0194764 A1 | 6/2021 | Badyan et al. |
| 2021/0294596 A1* | 9/2021 | Ashirvad .............. H04L 43/103 |
| 2021/0303465 A1* | 9/2021 | Tanaka ................ G06F 12/0897 |
| 2021/0357205 A1* | 11/2021 | Ashirvad ................ G06F 9/54 |
| 2021/0406039 A1* | 12/2021 | Theimer ................ G06F 9/44526 |
| 2021/0406071 A1* | 12/2021 | Groenewald ............ G06F 8/31 |
| 2022/0035617 A1* | 2/2022 | Elkady .................... H04W 4/70 |
| 2022/0083334 A1* | 3/2022 | Xiao ........................ G06F 8/315 |
| 2022/0137944 A1* | 5/2022 | Patterson ................ G06F 8/65 717/170 |
| 2022/0197625 A1* | 6/2022 | Franchitti ................ G06N 3/08 |
| 2022/0343185 A1* | 10/2022 | Ackerman ............ G06F 16/212 |

FOREIGN PATENT DOCUMENTS

| | | |
|---|---|---|
| WO | WO 99/34285 | 7/1999 |
| WO | WO 00/52559 | 9/2000 |
| WO | WO 01/79970 | 10/2001 |
| WO | 2018208506 A1 | 11/2018 |
| WO | 2021097253 A1 | 5/2021 |

OTHER PUBLICATIONS

International Search Report and Written Opinion, PCT Application PCT/US2022/081267, mailed Apr. 25, 2023.

* cited by examiner

NESTED REQUEST-RESPONSE PROTOCOL NETWORK COMMUNICATIONS

BACKGROUND

A remote network management platform may take the form of a hosted environment that provides application Platform-as-a-Service (aPaaS) services to users, particularly to operators of a managed network such as enterprises. Such services may take the form of web-based portals and/or software applications that enterprises, and both internal and external users thereof, may access through computational instances of the remote network management platform.

In a managed network environment, management of services and interfaces of a remote network management platform typically involve coordination and maintenance of software applications and associated data across multiple computing devices and systems. One aspect of this coordination and maintenance relates to version control and updates to help facilitate compatibility among network devices across which services are implemented, delivered, and consumed.

SUMMARY

Example embodiments herein provide systems and methods for enhancing coordination and maintenance of versions and/or updates of software applications and data across multiple computing devices and systems of a managed network. More particularly, when an application or service is carried out among, between, and/or across two or more networked computing devices or systems, proper execution may depend, at least in part, on compatibility of software versions and/or associated data. Incompatibilities may arise due to differing update or upgrade schedules among two or more computing devices, for example. In order to accommodate possible instances of unsynchronized software versions and/or associated data across two or more devices, the devices may engage in various communications to discover each other's version status, and take actions to ensure and/or coordinate compatibility. Such communications may serve as a form of discovery, allowing two or more devices to establish a baseline of compatible application capabilities and/or associated data. The communications may involve an exchange of capability data and/or other indications of each devices capabilities with respect to an identified set of applications or services, for example. Typical scenarios of network-based applications may involve communications between a client and server, though other arrangements are possible, such communications between two or more servers, or between controllers and agents, for example.

In the context of managed networks, and network-based applications generally, there exist widely adopted and implemented communication protocols used to support software applications and associated data. However, these same protocols can also impose limitations on operations involving coordination of capabilities among the computing devices and systems that implement the software applications and/or use/apply the associated data. More specifically, web-based and other network-based applications may typically communicate instructions and/or data asynchronously, using individual instances of a request-response protocol. For operations such as coordination of capabilities of two devices, the asynchronicity of processes on the devices can make it hard for the two devices to determine that they have correctly and/or successfully aligned their states of capability.

A common and widely adopted architectural style of a non-transactional protocol is the well-known "Representational State Transfer" ("REST") model. A non-limiting example of a protocol that follows REST is the widely used "hyper-text transfer protocol" ("HTTP"). While individual instances of request and response are generally adequate for—and in the case of REST and HTTP, for example, fairly "baked-in" to—support of operations of web-based and network-based applications, single-instance request-response communications can be ill-suited for transactional tasks involved in coordination of capabilities. These deficiencies can impose operational delays and other inefficiencies on capability discovery and coordination.

One approach to addressing the deficiencies of existing and widely deployed protocols could be to design and/or develop new protocols specifically targeting the transactional nature of coordinating capabilities of two or more networked computing devices. However, the inventor has recognized that the potentially high barrier to acceptance of replacing existing widely-adopted, industry-standard communication protocols with a new, initially unproven one-albeit one targeted to addressing deficiencies of the existing ones—can make the approach of replacement impractical or otherwise undesirable. Instead, the inventor has devised a novel technique for adapting existing request-response protocols to support transactional communications that are well-suited for coordinating and/or synchronizing capabilities of networked devices, thereby ensuring compatible operations. Accordingly, example embodiments herein provide systems and methods for nesting of request-response communications in a manner that introduces stateful transactions into otherwise non-transactional communications.

Example embodiments herein are described in terms of network-based applications and services carried out by two computing devices or systems that are communicatively coupled by a network or communications system. Networked-based applications may include web-based applications, but could include other types of applications carried out in coordination and/or communication between two computing devices. Non-limiting examples of communicating computing devices may include a client and a server, and/or a controller computing device and an agent computing device. In some scenarios, a controller computing device could be a server and an agent computing device could be a client. However, other arrangements are possible as well, such as between two servers or network devices, two clients, and other peer-to-peer arrangements. For purposes of illustration and by way of example herein, the two computing devices involved in example embodiments of nested request-response protocol communications will be taken to be a controller computing device and an agent computing device. This should not be seen as limiting with respect to other possible configurations of two or more computing devices.

Accordingly, a first example embodiment may involve a controller computing device comprising: memory containing controller data representing capabilities of the controller computing device; and one or more processors configured to: transmit, to an agent computing device, a controller request on a first instance of a request-response protocol, wherein the controller request comprises the controller data; after transmitting the controller request, receive, from the agent computing device, an agent request on a second instance of the request-response protocol, wherein the agent request comprises agent data representing capabilities of the agent computing device; store, in the memory, at least some of the agent data; transmit, to the agent computing device, a controller response to the agent request on the second instance of the request-response protocol, wherein the controller response acknowledges receipt of the agent request; and after transmitting the controller response, receive, from the agent computing device, an agent response on the first instance of the request-response protocol, wherein the agent response acknowledges receipt of the controller request.

A second example embodiment may involve an agent computing device comprising: memory containing agent data representing capabilities of the agent computing device; and one or more processors configured to: receive, from a controller computing device, a controller request on a first instance of a request-response protocol, wherein the controller request comprises controller data representing capabilities of the controller computing device; store, in the memory, at least some of the controller data; after receiving the controller request, transmit, to the controller computing device, an agent request on a second instance of the request-response protocol, wherein the agent request comprises at least some of the agent data; receive, from the controller computing device, a controller response to the agent request on the second instance of the request-response protocol, wherein the controller response acknowledges receipt of the agent request; and after receiving the controller response, transmit, to the controller computing device, an agent response on the first instance of the request-response protocol, wherein the agent response acknowledges receipt of the controller request.

A third example embodiment may involve a method comprising: transmitting from a controller computing device to an agent computing device a controller request on a first instance of a request-response protocol, wherein the controller request comprises controller data representing capabilities of the controller computing device; after transmitting the controller request, receiving at the controller computing device from the agent computing device, an agent request on a second instance of the request-response protocol, wherein the agent request comprises agent data representing capabilities of the agent computing device; storing in memory of the controller computing device, at least some of the agent data; transmitting from the controller computing device to the agent computing device a controller response to the agent request on the second instance of the request-response protocol, wherein the controller response acknowledges receipt of the agent request; and after transmitting the controller response, receiving at the controller computing device from the agent computing device, an agent response on the first instance of the request-response protocol, wherein the agent response acknowledges receipt of the controller request In a fourth example embodiment, an article of manufacture may include a non-transitory computer-readable medium, having stored thereon program instructions that, upon execution by a computing system controller computing device, cause the computing system to perform operations in accordance with the first and/or second example embodiment.

In a fourth example embodiment, a computing system may include at least one processor, as well as memory and program instructions. The program instructions may be stored in the memory, and upon execution by the at least one processor, cause the computing system to perform operations in accordance with the first and/or second example embodiment.

In a fifth example embodiment, a system may include various means for carrying out each of the operations of the first, second, and/or third example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
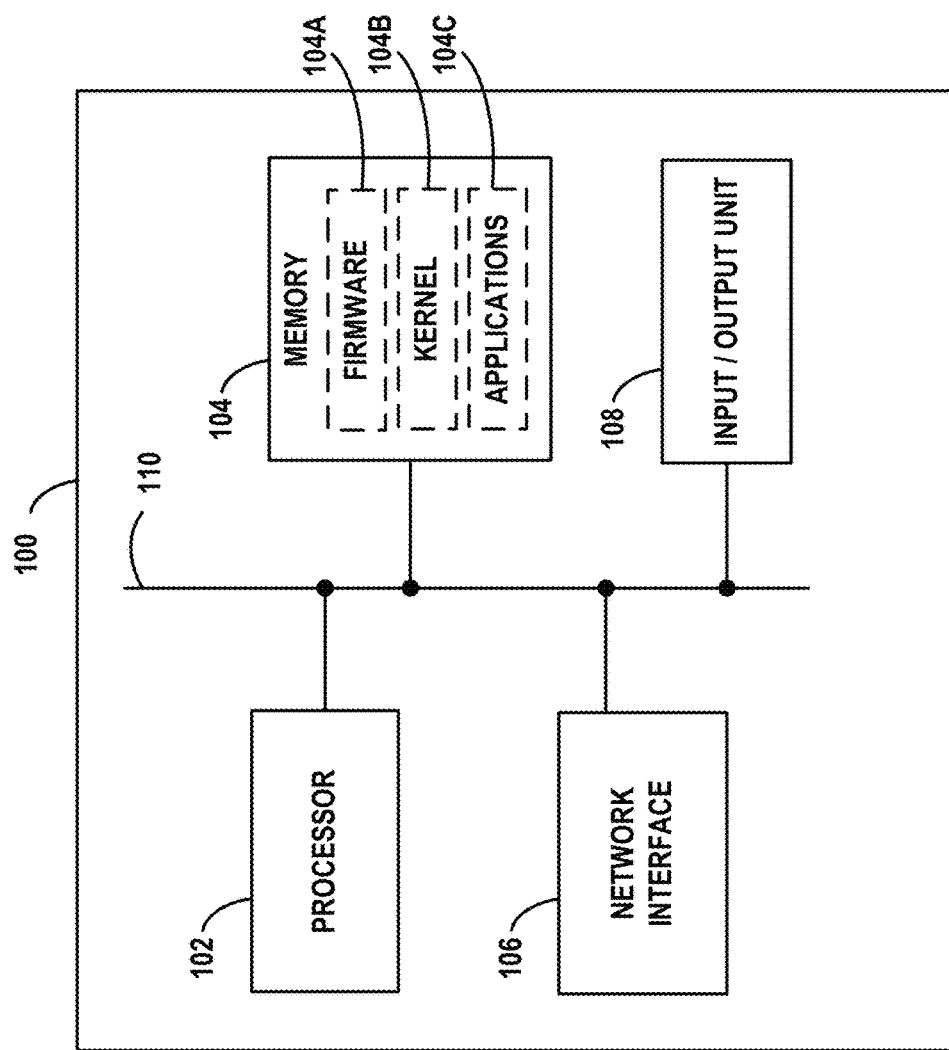
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

The following discussion is presented, by way of example, in the context of a large enterprise. It should be understood that the various architectural and operational principles of example embodiments herein are not limited by this exemplary context. Nor are the various architectural and operational principles of example embodiments constrained to apply to a large enterprise. Rather, example embodiments may apply and/or extent to any usage scenario involving client devices, server devices, and other computing devices that may implement services and resources that involve common and/or coordinated software and data components . . . .

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline, and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflows for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, and delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The MVC architecture discussed by way of example herein should not be viewed as limiting with respect to example embodiments. Other architectural paradigms may be possible as well, such as unidirectional data-flow.

The aPaaS system may also support a rich set of predefined functionality that can be added to applications. These features include support for searching, email, templating, workflow design, reporting, analytics, social media, scripting, mobile-friendly output, and customized GUIs.

Such an aPaaS system may represent a GUI in various ways. For example, a server device of the aPaaS system may generate a representation of a GUI using a combination of HTML and JAVASCRIPT®. The JAVASCRIPT® may include client-side executable code, server-side executable code, or both. The server device may transmit or otherwise provide this representation to a client device for the client device to display on a screen according to its locally-defined look and feel. Alternatively, a representation of a GUI may take other forms, such as an intermediate form (e.g., JAVA® byte-code) that a client device can use to directly generate graphical output therefrom. Other possibilities exist.

Further, user interaction with GUI elements, such as buttons, menus, tabs, sliders, checkboxes, toggles, etc. may be referred to as "selection", "activation", or "actuation" thereof. These terms may be used regardless of whether the GUI elements are interacted with by way of keyboard, pointing device, touchscreen, or another mechanism.

An aPaaS architecture is particularly powerful when integrated with an enterprise's network and used to manage such a network. The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and input/output unit 108, all of which may be coupled by system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling, and management of processes, input/output, and communication. Kernel 104B may also include device drivers that allow the operating system to communicate with the hardware modules (e.g., memory units, networking interfaces, ports, and buses) of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
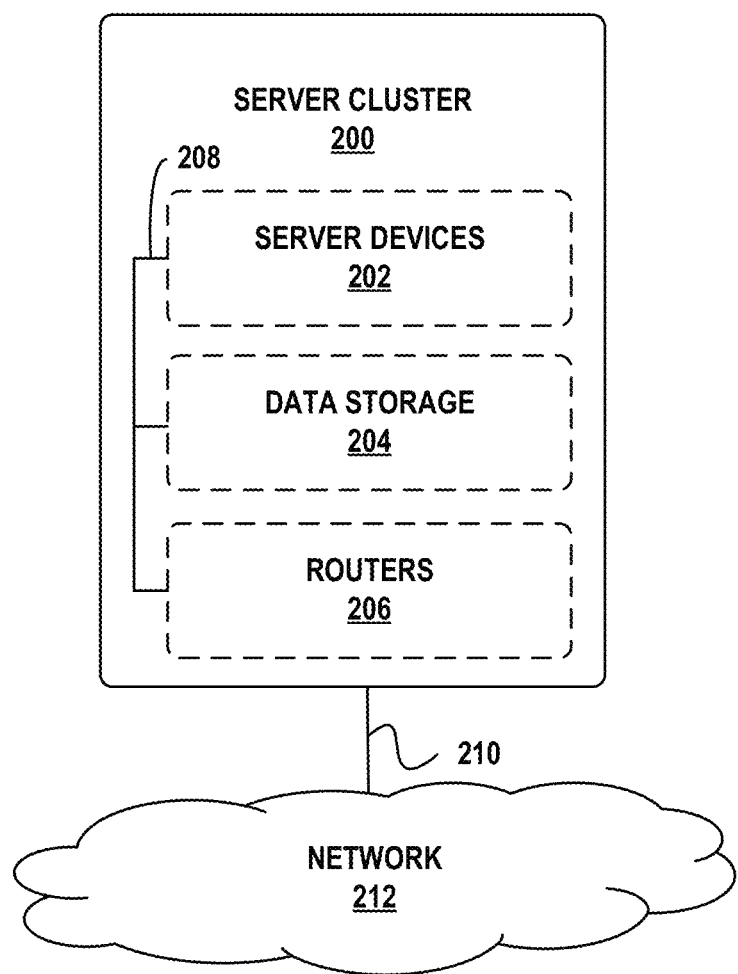
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purposes of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency, and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page or web application representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages. Alternatively or additionally, JAVA® may be used to facilitate generation of web pages and/or to provide web application functionality.

III. Example Remote Network Management Architecture

Figure 3:
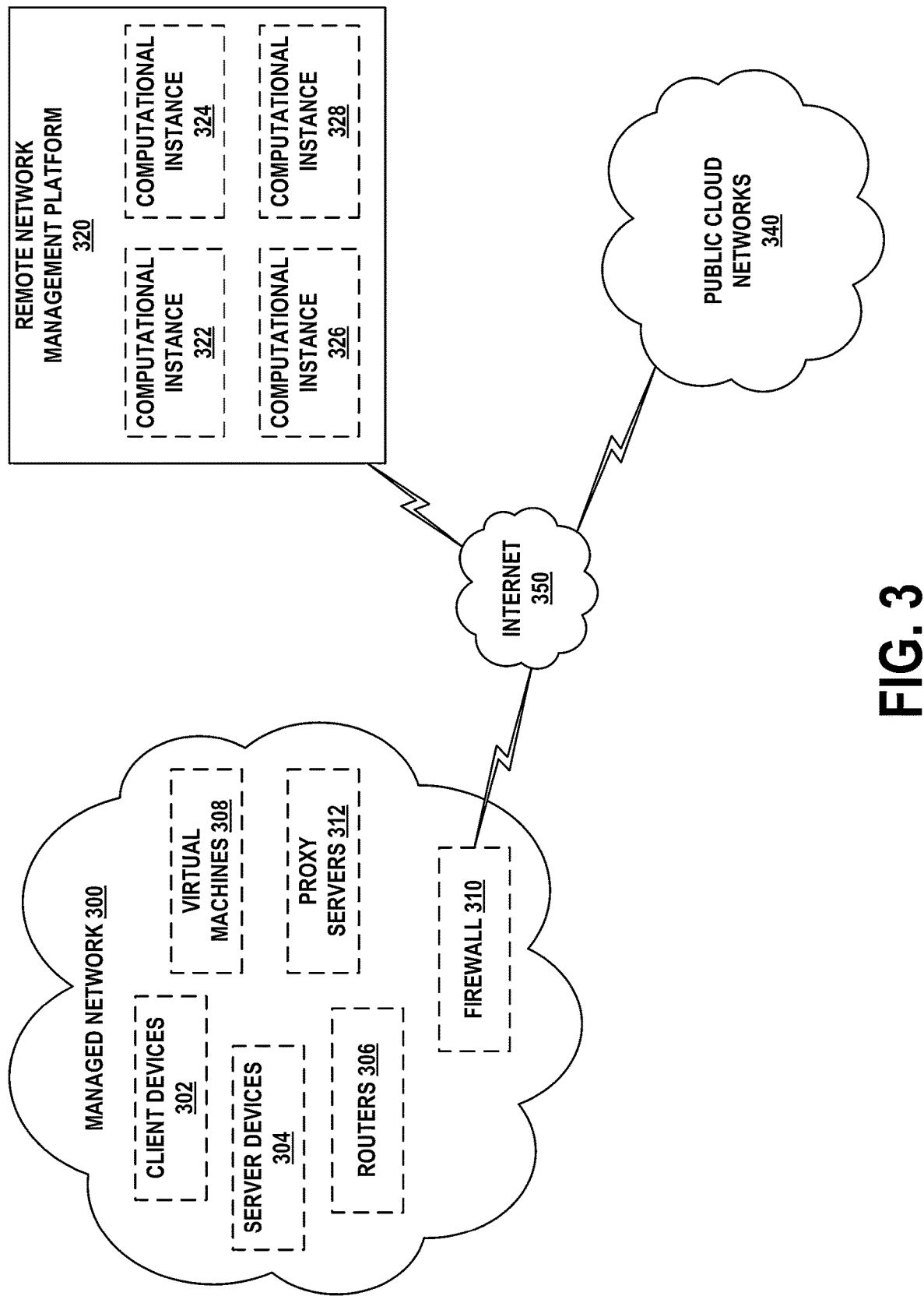
FIG. 3 depicts a remote network management architecture, in accordance with example embodiments.

FIG. 3 depicts a remote network management architecture, in accordance with example embodiments. This architecture includes three main components—managed network 300, remote network management platform 320, and public cloud networks 340—all connected by way of Internet 350.

A. Managed Networks

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server application that facilitates communication and movement of data between managed network 300, remote network management platform 320, and public cloud networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of public cloud networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

B. Remote Network Management Platforms

Remote network management platform 320 is a hosted environment that provides aPaaS services to users, particularly to the operator of managed network 300. These services may take the form of web-based portals, for example, using the aforementioned web-based technologies. Thus, a user can securely access remote network management platform 320 from, for example, client devices 302, or potentially from a client device outside of managed network 300. By way of the web-based portals, users may design, test, and deploy applications, generate reports, view analytics, and perform other tasks. Remote network management platform 320 may also be referred to as a multi-application platform.

As shown in FIG. 3, remote network management platform 320 includes four computational instances 322, 324, 326, and 328. Each of these computational instances may represent one or more server nodes operating dedicated copies of the aPaaS software and/or one or more database nodes. The arrangement of server and database nodes on physical server devices and/or virtual machines can be flexible and may vary based on enterprise needs. In combination, these nodes may provide a set of web portals, services, and applications (e.g., a wholly-functioning aPaaS system) available to a particular enterprise. In some cases, a single enterprise may use multiple computational instances.

For example, managed network 300 may be an enterprise customer of remote network management platform 320, and may use computational instances 322, 324, and 326. The reason for providing multiple computational instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows within one or more database tables).

For purposes of clarity, the disclosure herein refers to the arrangement of application nodes, database nodes, aPaaS software executing thereon, and underlying hardware as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may affect all customers' data, creating additional risk, especially for entities subject to governmental, healthcare, and/or financial regulation. Furthermore, any database operations that affect one customer will likely affect all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of application and database nodes disposed upon some number of physical server devices or virtual machines. Such a central instance may serve as a repository for specific configurations of computational instances as well as data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate virtual machines that dedicate varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, a computational instance such as computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

C. Public Cloud Networks

Public cloud networks 340 may be remote server devices (e.g., a plurality of server clusters such as server cluster 200) that can be used for outsourced computation, data storage, communication, and service hosting operations. These servers may be virtualized (i.e., the servers may be virtual machines). Examples of public cloud networks 340 may include AMAZON WEB SERVICES® and MICROSOFT® AZURE®. Like remote network management platform 320, multiple server clusters supporting public cloud networks 340 may be deployed at geographically diverse locations for purposes of load balancing, redundancy, and/or high availability.

Managed network 300 may use one or more of public cloud networks 340 to deploy applications and services to its clients and customers. For instance, if managed network 300 provides online music streaming services, public cloud networks 340 may store the music files and provide web interface and streaming capabilities. In this way, the enterprise of managed network 300 does not have to build and maintain its own servers for these operations.

Remote network management platform 320 may include modules that integrate with public cloud networks 340 to expose virtual machines and managed services therein to managed network 300. The modules may allow users to request virtual resources, discover allocated resources, and provide flexible reporting for public cloud networks 340. In order to establish this functionality, a user from managed network 300 might first establish an account with public cloud networks 340, and request a set of associated resources. Then, the user may enter the account information into the appropriate modules of remote network management platform 320. These modules may then automatically discover the manageable resources in the account, and also provide reports related to usage, performance, and billing.

D. Communication Support and Other Operations

Internet 350 may represent a portion of the global Internet. However, Internet 350 may alternatively represent a different type of network, such as a private wide-area or local-area packet-switched network.

Figure 4:
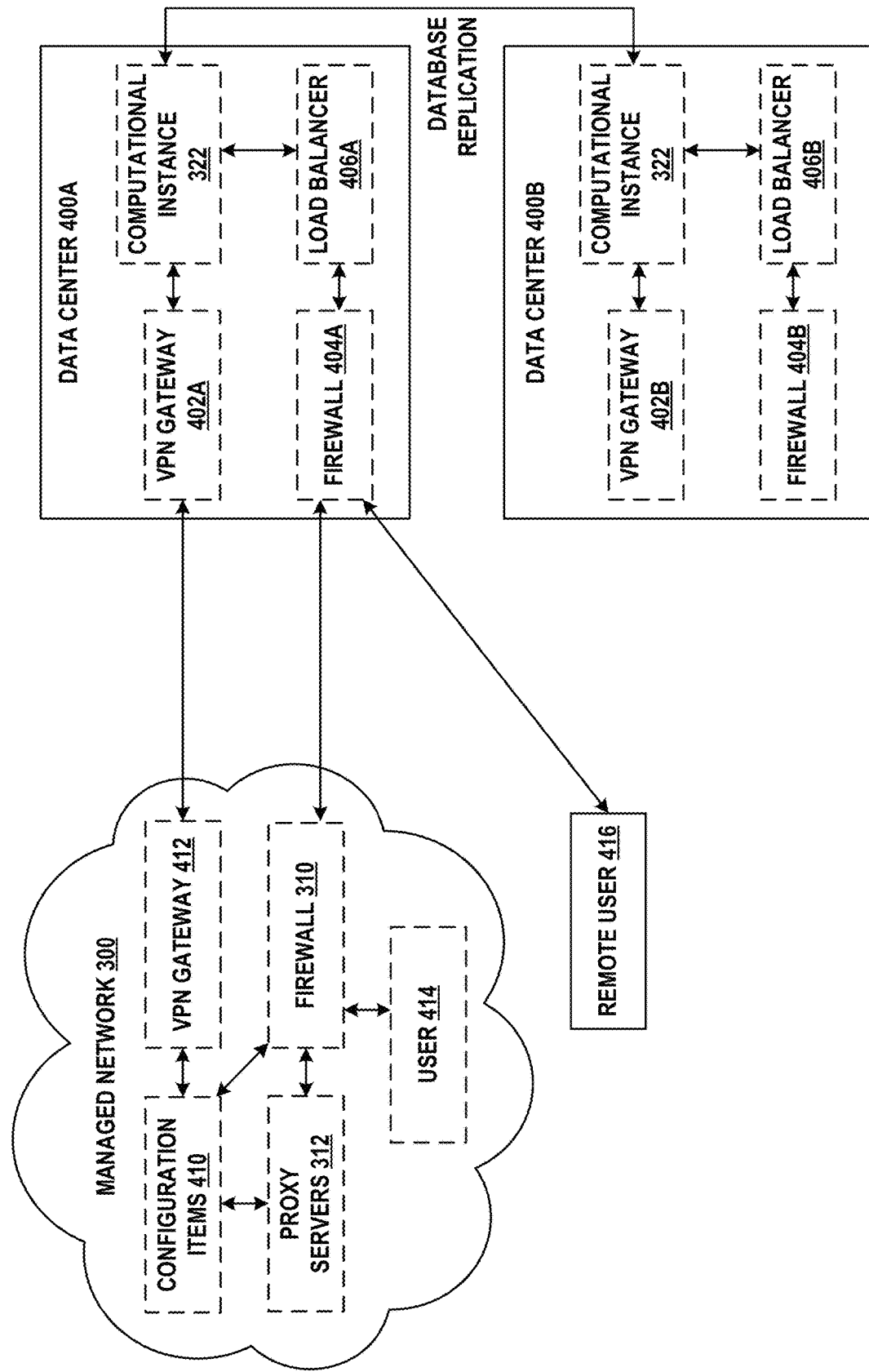
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated, in whole or in part, across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. Example Device, Application, and Service Discovery

In order for remote network management platform 320 to administer the devices, applications, and services of managed network 300, remote network management platform 320 may first determine what devices are present in managed network 300, the configurations and operational statuses of these devices, and the applications and services provided by the devices, as well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purposes of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
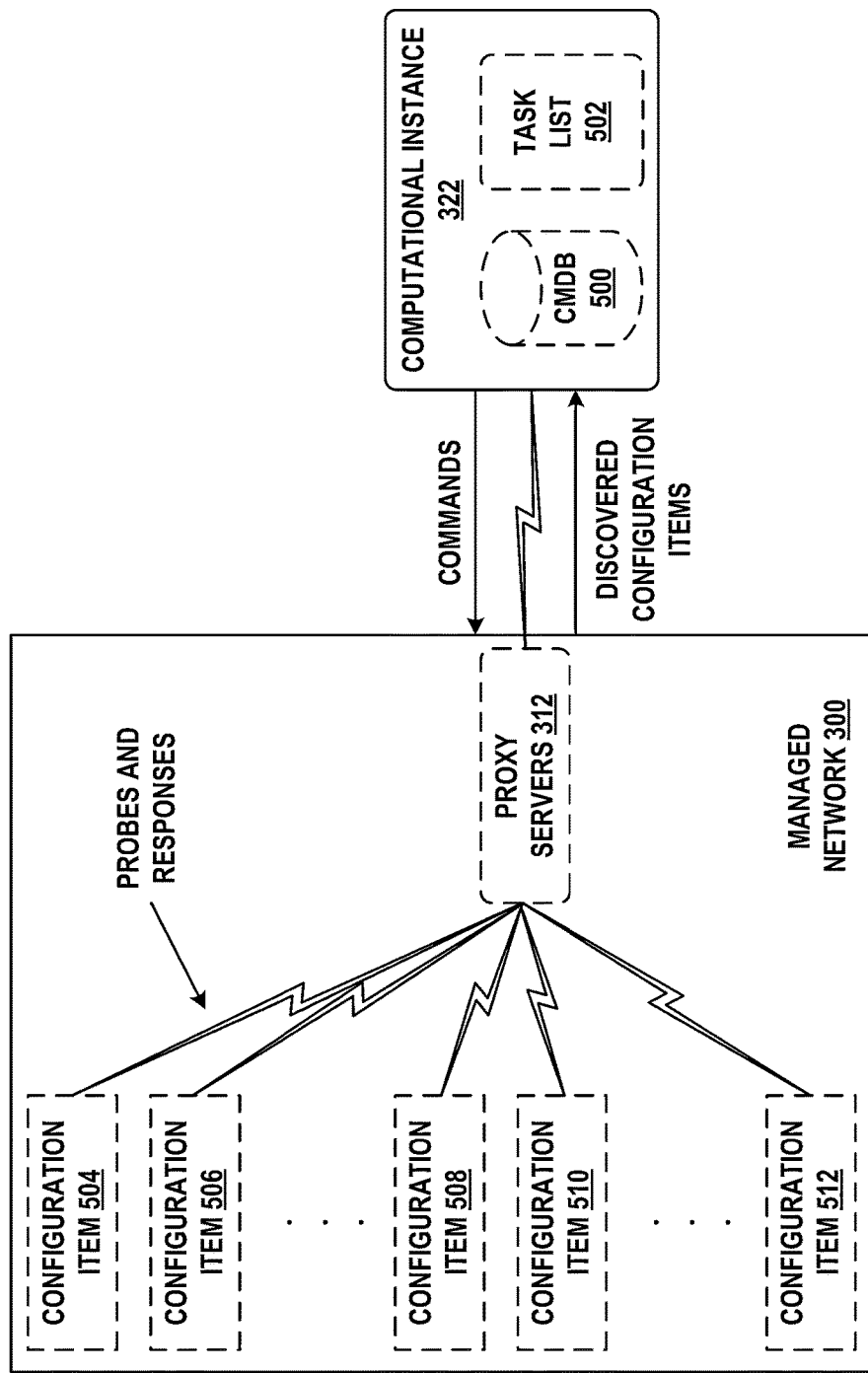
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, public cloud networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration, and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For example, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
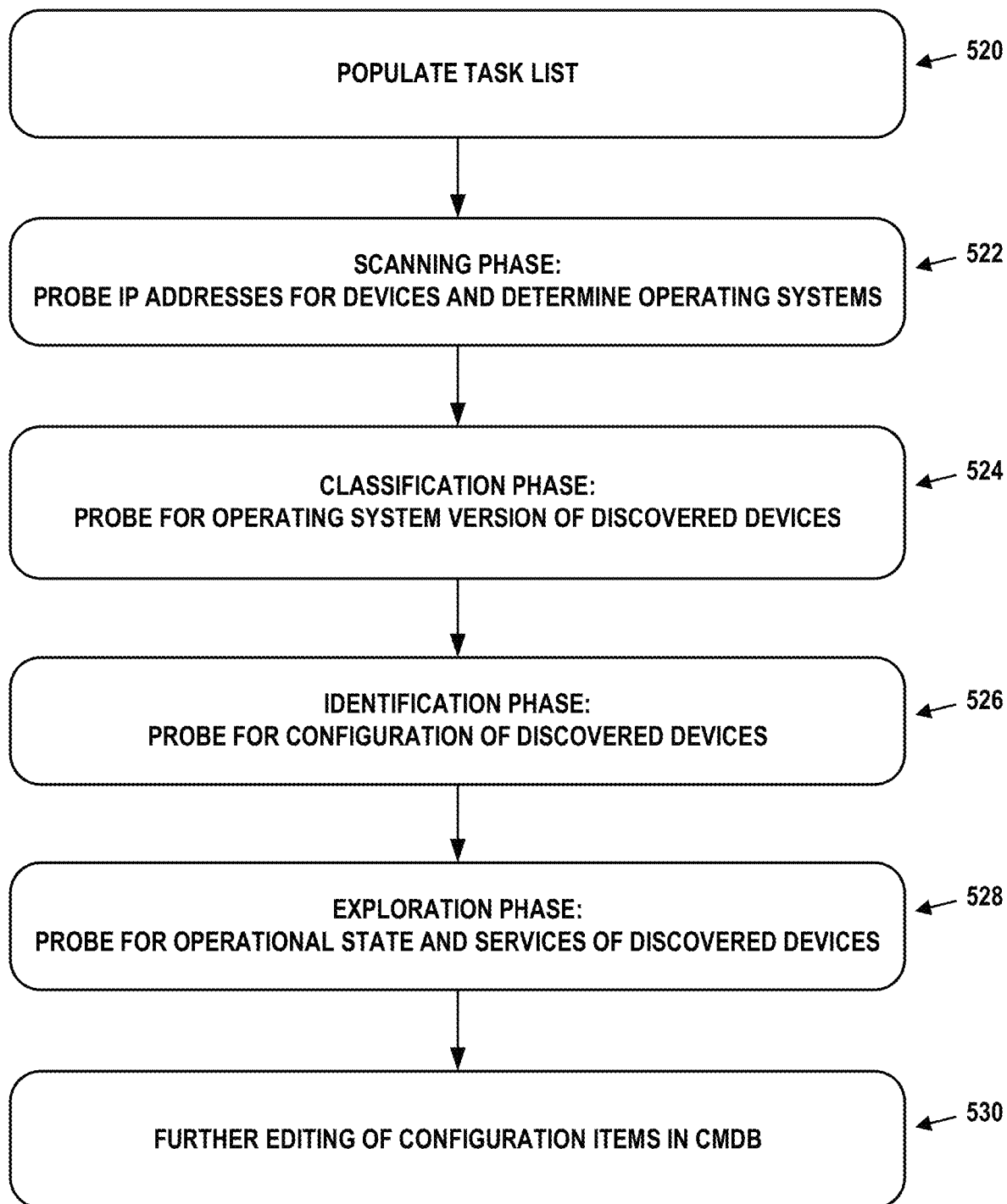
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are examples. Discovery may be a highly configurable procedure that can have more or fewer phases, and the operations of each phase may vary. In some cases, one or more phases may be customized, or may otherwise deviate from the exemplary descriptions above.

In this manner, a remote network management platform may discover and inventory the hardware, software, and services deployed on and provided by the managed network. As noted above, this data may be stored in a CMDB of the associated computational instance as configuration items. For example, individual hardware components (e.g., computing devices, virtual servers, databases, routers, etc.) may be represented as hardware configuration items, while the applications installed and/or executing thereon may be represented as software configuration items.

The relationship between a software configuration item installed or executing on a hardware configuration item may take various forms, such as "is hosted on", "runs on", or "depends on". Thus, a database application installed on a server device may have the relationship "is hosted on" with the server device to indicate that the database application is hosted on the server device. In some embodiments, the server device may have a reciprocal relationship of "used by" with the database application to indicate that the server device is used by the database application. These relationships may be automatically found using the discovery procedures described above, though it is possible to manually set relationships as well.

The relationship between a service and one or more software configuration items may also take various forms. As an example, a web service may include a web server software configuration item and a database application software configuration item, each installed on different hardware configuration items. The web service may have a "depends on" relationship with both of these software configuration items, while the software configuration items have a "used by" reciprocal relationship with the web service. Services might not be able to be fully determined by discovery procedures, and instead may rely on service mapping (e.g., probing configuration files and/or carrying out network traffic analysis to determine service level relationships between configuration items) and possibly some extent of manual configuration.

Regardless of how relationship information is obtained, it can be valuable for the operation of a managed network. Notably, IT personnel can quickly determine where certain software applications are deployed, and what configuration items make up a service. This allows for rapid pinpointing of root causes of service outages or degradation. For example, if two different services are suffering from slow response times, the CMDB can be queried (perhaps among other activities) to determine that the root cause is a database application that is used by both services having high processor utilization. Thus, IT personnel can address the database application rather than waste time considering the health and performance of other configuration items that make up the services.

V. Nesting of Request-Response Protocol Communications

Network-based applications are examples of programs that operate across two or more computing devices. In a managed network context, for example, typical arrangements may include controller-agent applications, which may be distributed across two (or more) servers. Other examples may include client-server programs, such as web-based applications. Before application programs distributed across two or more servers can communicate, connectivity between dependent application components and servers may first need to be established, including coordination of application features and/or capabilities. This may entail two servers or other computing devices establishing an ongoing secure communication channel using a pre-determined and negotiated protocol, for example.

More generally, proper operation of distributed applications may depend, at least in part, on synchronization and/or or coordination of application program versions installed and/or operating on the various communicatively-connected computing devices. Synchronization and coordination may involve ensuring that identical and/or compatible versions of software functionality and/or associated application-related data runs and/or is resident on two or more computing devices involved in distributed program execution. Unsynchronized program versions and/or incompatible capabilities with respect to distributed software could result from upgrades to one computing device or system, or common upgrades being applied at different times, for example.

Example embodiments are described herein in the context of, by way of example, a configuration of a controller computing device and an agent computing device. A controller computing device could be a server and an agent computing device could be a client. However, other arrangements are possible. For example the controller and agent computing devices could both be servers or other network computing devices or systems, or both could be client devices that implement controller and agent components of an application program, for example. In any case, it should be understood that there is no loss in generality with respect to example embodiments by considering a controller-agent configuration.

In a typical use case or other operational scenario, a controller computing device may initiate a form of capabilities discovery procedure with an agent computing device in order to ensure that both devices are, or can be made, operationally compatible with respect to one or more application programs. Compatibility may relate to program features and functions and/or associated data. Compatibility of features and functions may be determined according to coordination of version numbers, for example; compatibility of associated data may be determined according some form of minimum commonality of data definitions on both devices, for example. There may be other operations involved in coordinating compatibility, such as running configuration initialization operations on one or both of the devices, for example. Some example illustrations of compatibility of device capabilities are discussed below.

In the discussion herein of synchronization and/or coordination of capabilities, and determination of compatibility of capabilities of two or more devices, the term "discovery" as well as the associated processes involved are applied in a somewhat more specific manner than discovery describe above in the context of remotely managed networks and computational instances. More particularly, in the context of remotely manageable network resources, such as devices, applications, and services, discovery more broadly involves processes for learning about availability, location, and configuration of network resources. In the context of device capabilities, discovery involves processes for learning about compatibility across and/or among devices of distributed application programs and associated data. It should also be noted that capabilities discovery is only one example context in which example embodiments of nested request-response protocols may be used.

As a further illustration of a typical use case or other operational scenario, a software application may be upgraded across servers of a network at different times such that, at one time or another, a controller and an agent have different capabilities. As a result, existing connections may need to be renegotiated. To use new (e.g., upgraded) capabilities, both the controller and the agent would need to update their connection and be able to confirm that it can support previously unsupported capabilities. With conventional asynchronous processing and network communications, a local controller computing device (or just a server) may start an asynchronous process that sends a request via a network to a remote agent computing device (or just another server) that starts another asynchronous process. Local and remote processes can each run to completion, resulting in terminal states of success or error, for example. However, due to the nature of asynchronous processing, one process may complete before the other, or one process's result may depend on the result of the other's. In some instances, the processes may also have very low fault-tolerance. If the servers are each left to create and enable connections, or chose and enable the capabilities to use on the connection independently, then one server may complete that process successfully while the other server may terminate with an error condition or with incomplete information. This can result one server having an active connection able to support a particular set of features or capabilities, while the other server shows the connection in an error state. This mismatch of states can then lead to improper operation of the distributed application and/or other erroneous or undesirable functionality.

A conventional approach to coordination of capabilities may be to poll the remote server to check the status or progress of a remote asynchronous process. However, this approach may not be able to account for errors that don't exhibit a remotely discoverable terminal status of success or error, and instead may lead to polling that continues indefinitely. In other instances, an asynchronous remote process may include a final step of flipping a connection state to active while initializing and establishing a connection. If done asynchronously and without coordination, one system may execute an initialization process and flip the state to active and begin using it before the other system has completed initialization and is prepared to accept commands across the connection. These are just a few examples of the deficiencies of conventional techniques in the context of managed network. The problem may be understood more generally in terms of a stateless request-response communication protocol applied to transactional operations between two computing devices.

A. Example Network Communication Protocols for Distributed Applications

For many—and perhaps most-current network-based applications (e.g., web-based applications), communication between application instances or components distributed across different devices is commonly supported by individual instances of stateless request-response communication protocols. A well-known example is HTTP, which largely follows the REST model. These protocols are mature, widely-adopted, and may be de facto, if not industry, standards for many applications, and/or many managed networks that implement distributed software applications. Protocols that follow or are compliant with REST are sometimes referred to as "RESTful" protocols.

For illustrative purposes, the REST architecture model may be understood with respect to a client-server model as follows. A REST server may provide access to (web) resources, and a REST client may access and modify resources obtained. Communication between client and server may be supported by "methods," which are typically issued as requests from a client to a server. Upon acting on a request (e.g., method), the server may send a response, possibly including resources provided in a representational form such as JSON and/or XML.

In the client-server context, the roles of client and server are associated with which entity sends requests, and which sends responses to the requests. It should be understood, however, that the client and server roles need not be restricted to specific types of devices that may typically assume such roles. For example two customarily-client devices, such as end-user devices (desktop computers, smartphones, etc.) may engage in a RESTful protocol for some particular distributed application program, such that one end-user device acts as a client and the other acts as a server. Similarly, two customarily-server devices, such as two servers of a remote network management system, may do the same, with one acting as client and the other as server in the context of some other distributed application program. Other arrangements are possible as well.

REST may be implemented using a standard application programming interface (API), HTTP perhaps being the most common (though not the only one possible). In some implementations, REST may use just four HTTP methods, listed below in tabular form.

| Method | Purpose |
|--------|---------|
| GET | Provide a read only access to a resource |
| POST | Create a new resource |
| DELETE | Remove a resource |
| PUT | Update an existing resource or create a new resource |

In some implementations, REST may use additional methods, such as PATCH and/or OPTIONS. Other implementations may use fewer methods than even the four listed here.

A method may be sent as an HTTP request from a first computing device (e.g., controller computing device) to a second computing device (e.g., agent computing device), and the second computing device may respond by sending an HTTP response to the first computing device. Each request-response pair is carried out as a separate instance. As noted, a RESTful protocol may be implement with various types of device pairs, such as client-client, or server-server, which may correspond to the examples of controller-agent configurations considered in example embodiments herein. The illustration of client-server above is one example of roles of requester and responder in a request-response protocol, but is not intended to be limiting.

While a capabilities discovery procedure may entail stateful, transactional communications between a controller computing device and an agent computing device, the request-response nature of REST, HTTP, and other similar models and protocols is not well-suited for transactional communications. As a result, capabilities discovery procedures for many-if not most or all-web-based (and network-based) applications may be subject to limitations that impose delays and/or other performance and/or operational inefficiencies. Accordingly, example embodiments herein provide systems and methods for nesting request-response protocols to address their limitations in transactional communication. More particularly, nesting of request-response communication protocols described by way of example herein introduces stateful transactional communications into protocols that otherwise lack them. Advantageously, this addresses the deficiencies of widely-used request-response communication protocols without having to replace them and/or start from scratch.

Although example embodiments herein are illustrated in terms of addressing short-comings of request-response communication protocols for capabilities discovery procedures, it should be understood that the novel and advantageous techniques of nesting request-response communications may be more generally applied to any scenario or circumstance in which a stateless request-response communication protocol imposes limitations on a procedure or process that would be better-supported by, or benefit from, stateful transactional communications. Thus, the example embodiments herein should not be viewed as limiting with respect to other applications of nesting of request-response communications.

It may be noted that individual instances of request-response protocol communications may sometimes be described as uni-directional communication or half-duplex. This description does not negate the bi-directional nature of a request followed by a response. Rather, it focuses on the statelessness of the protocol used for communication between two asynchronous processes. Another characteristic of half-duplex communications of consequence in the context of request-response protocol communications between two computing instances (e.g., two computing devices) is that only one of the instances can provide request data into a given request-response instance.

Before describing examples of conventional operation with separate instances of request-response communication and examples of nest instances of request-response communication, a brief illustration of coordination and synchronization of compatibilities of capabilities of two devices is presented.

B. Coordination and Compatibility of Capabilities

Figure 6:
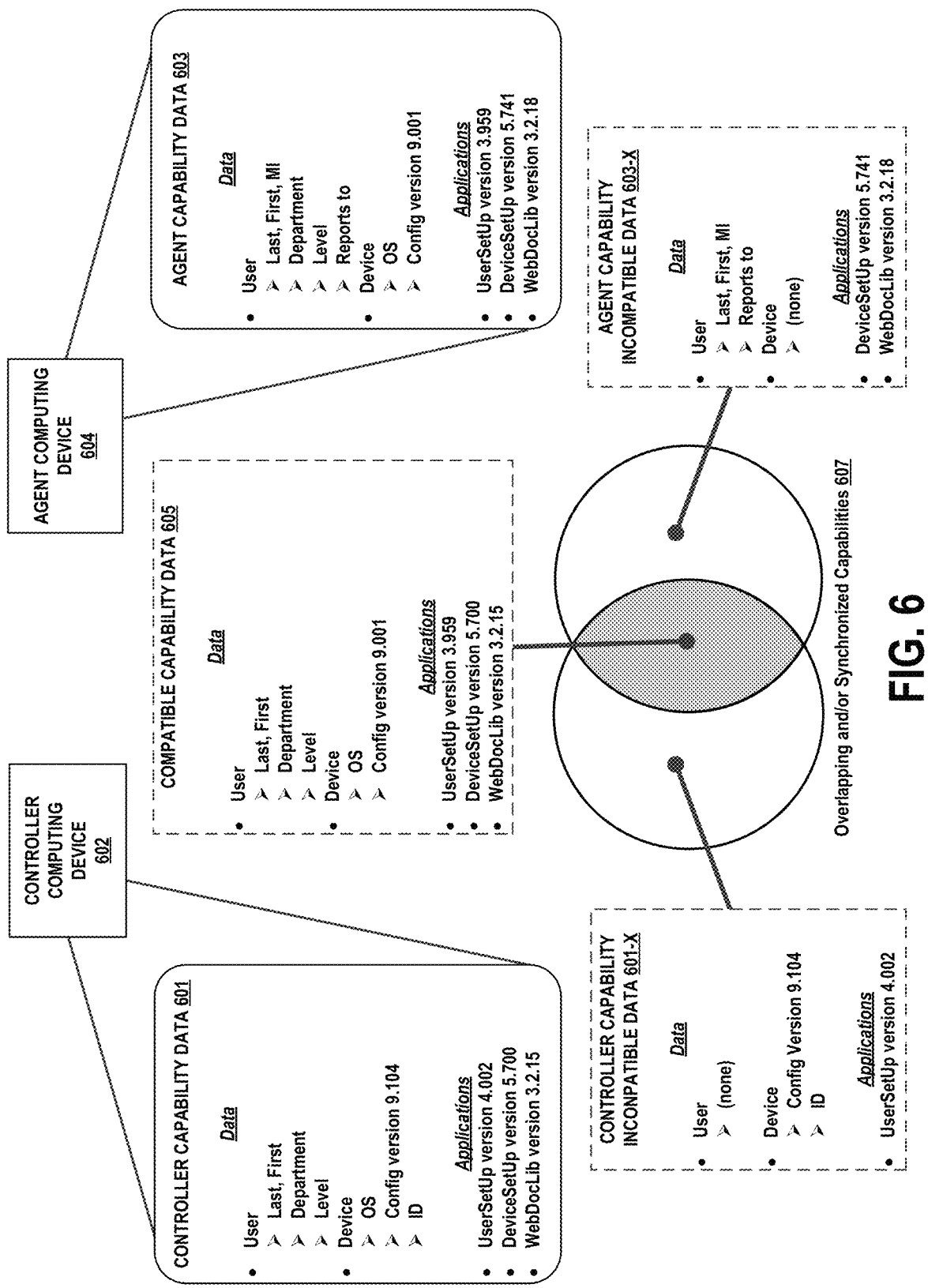
FIG. 6 illustrates example device capability data and compatibility configurations of two example devices, in accordance with example embodiments.

FIG. 6 illustrates example device capability data and compatibility configurations of two example devices, in accordance with example embodiments. As shown, a controller computing device 602 may have associated controller capability data 601, and agent computing device 604 may have associated agent capability data 603. Capability data shown for each device serves largely as a conceptual illustration, with the capabilities represented in a literal sense. In practice, capabilities data may take more abstract forms in storage and/or transfer. The literal representation of capabilities data in FIG. 6 is not intended to be limiting with respect to example embodiments. By way of example, the capability data of both devices includes a listing of user and device data, including at least one data version number, as well as a listing of supported applications, including application version numbers.

A determination of compatible capabilities may be considered an intersection of the controller capability data 601 and the agent capability data 603. This intersection is represented as a sort of Venn diagram shown as overlapping and/or synchronized capabilities 607. As shown, the overlapping or intersection yields compatible capability data 605, while the capability data excluded by the intersection is shown as controller capability incompatible data 601-X and agent capability incompatible data 603-X.

In the particular illustrative examples of FIG. 6, the compatible user data includes "Last, First," while the middle initial ("MI") and "Reports to" that are part of the agent capability data 603 are excluded. The compatible device data includes "OS" and "Config version 9.001," while "Config version 9.104" and "ID" of the controller capability data 601 are excluded. The compatible applications are "UserSetUp version 3.959," "DeviceSetUp version 5.700," and "WebDocLib version 3.2.15," while "UserSetUp version 4.002" of the controller capability data 601 and "DeviceSetUp version 5.741" and "WebDocLib version 3.2.18" of the agent capability data are exclude. For this example, it is assumed that later versions of software applications and data configurations are backward-compatible with earlier versions, such that two or more computing devices using an earliest version would be compatible.

The example compatible capability data 605 of FIG. 6 may be considered as representing a synchronized capability state of the controller computing device 602 and the agent computing device 604. In accordance with example embodiments, a synchronized capability state may be achieved through a procedure for coordination of capabilities. As mentioned above, conventional use of single instances of a request-response communication protocol may be inefficient, and in some instances fail to successfully achieve a proper state synchronized capabilities. An example of a conventional approach is described next, followed by example embodiments of nested request-response communications.

C. Conventional Operation

Figure 7:
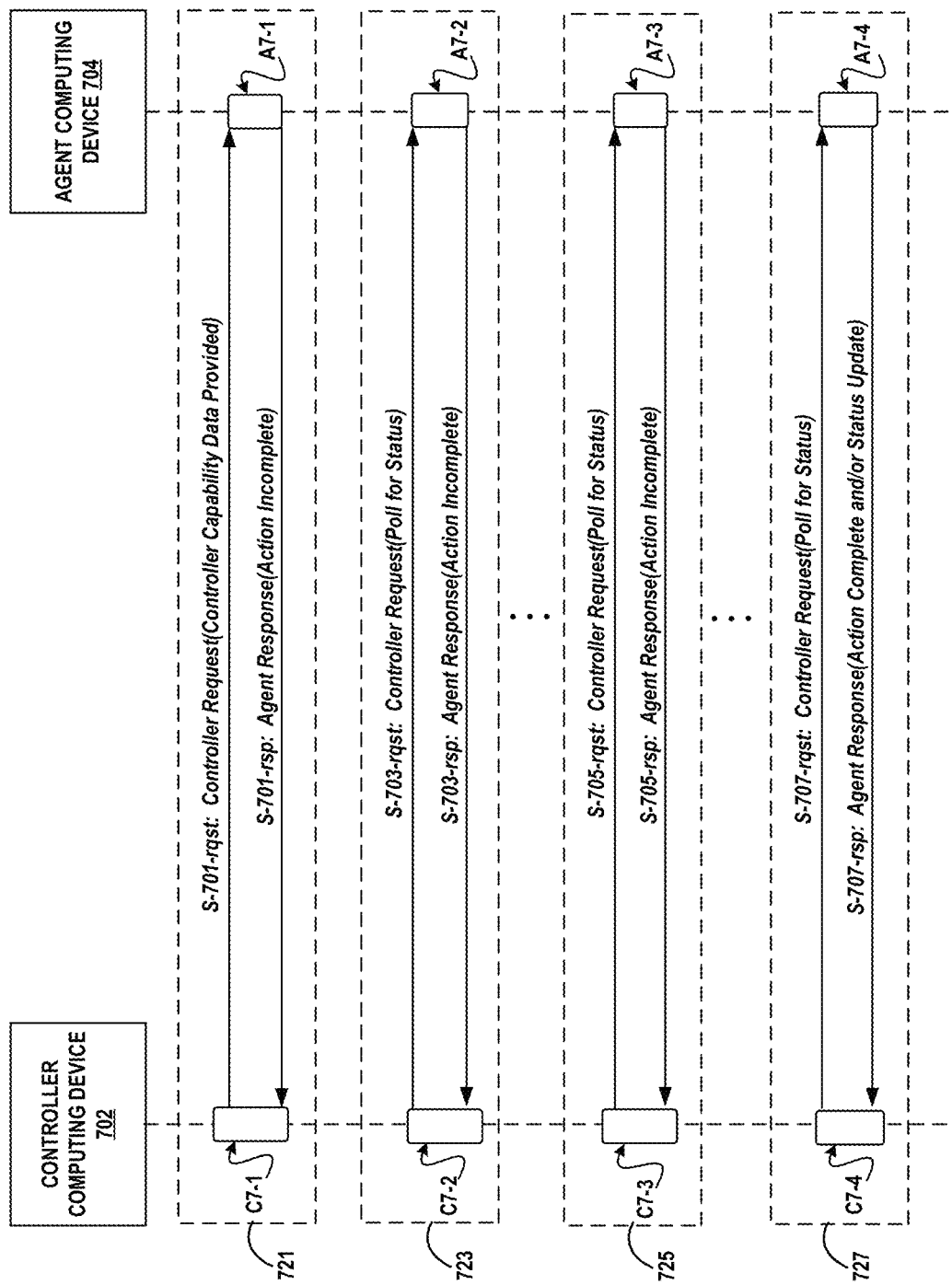
FIG. 7 illustrates an example of conventional request-response protocol communications between two example devices.

An example of conventional use of a request-response communication protocol for coordination of capabilities is shown in FIG. 7 in the form of a message flow diagram between a controller computing device 702 and an agent computing device 704. The message flow is illustrated as a generic request-response protocol; it could be implemented using HTTP or another REST-like protocol, for example. In the message flow diagram, messages are represented by horizontal arrows between the controller computing devices 702 and 704, with time increasing downward in the figure. No specific time scale is implied, though typical times between a request and associate response may be on the order of one to two seconds, for example. Longer and/or shorter times are possible as well.

The basic flow of the communications involves individual instances of request-response message pairs. The individual instances are identified in the FIG. 7 by dashed rectangles 721, 723, 725, and 727. Additionally, each instance of a request-response message pair may be carried out by a respective thread of execution on the two computing devices. Execution threads are represented by short rectangular segments on the vertical timelines below the controller computing device 702 and the agent computing device 704. Specifically, instance 721 is shown as carried out by thread C7-1 on the controller computing device 702 and thread A7-1 on the agent computing device 704. Similarly, instance 723 is shown as carried out by thread C7-2 on the controller computing device 702 and thread A7-2 on the agent computing device 704; instance 725 is shown as carried out by thread C7-3 on the controller computing device 702 and thread A7-3 on the agent computing device 704; and instance 727 is shown as carried out by thread C7-4 on the controller computing device 702 and thread A7-4 on the agent computing device 704. In other arrangements, a single thread on each device could carry out all the instances.

In the illustrated example, instance 721 involves the controller computing device 702 sending to the agent computing device 704 a controller request message S-701-rqst, which is a controller request that includes at least some of the controller capability data. Receipt of S-701-rqst at the agent computing device 704 may cause the device to invoke the tread A7-1. This thread may generate and send an agent response message S-107-rsp, which is an agent response acknowledging the controller request message S-701-rqst.

Receipt of the controller request message S-701-rqst may also cause the agent computing device 704 to carry one or more operations relating to determination of intersection capabilities, as well as one or more initialization operations, such as selecting compatible capabilities and setting a state of the connection, as described by way of example above. As also described above, the controller computing device 702 may also carry out on one or more initialization and/or state-setting operations, such as making capabilities known to other application programs that may be operating on the controller computing device. Similar processes may be carried out on the agent computing device—or at least the controller computing device may, in conventional operation, assume that they are carried out. However, it may not necessarily be possible for the controller computing device 702 to determine the capability synchronization status of itself and the agent computing device from just the single request-response instance 721.

Continuing with the example of FIG. 7, the controller computing device 702 next engages in successive polling attempts to determine if the agent computing device 704 has successfully determined the compatible capabilities and has successfully transitioned to a corresponding state. Thus, in instance 723, the polling may involve controller request message S-703-rqst, which is a controller request for status, followed by agent response message S-703-rsp, which is an agent response acknowledging the controller request message S-703-rqst with, for example, only an indication that an action responsive to the request has not yet completed. A second polling may involve controller request message S-705-rqst, which is another controller request for status, followed by agent response message S-705-rsp, which is another agent response acknowledging the controller request message S-705-rqst, but which may again only indicate that the action responsive to the request has not yet completed. In this example, after a final controller request message S-707-rqst polling for status, the agent computing device responds with an agent response message S-707-rsp, which acknowledges the agent request message S-707-rqst with an indication that the action is complete and/or with a status update.

This polling approach can be inefficient and/or incur significant delay. In addition, it is possible in some instances for the polling to continue indefinitely, or for more than just a few cycles. This is indicated in FIG. 7 by the vertical ellipses between the polling instances. One of the main causes of the drawback of the conventional approach is the stateless nature of the individual instances of the request-response communication protocol, and its application to a procedure that is transactional in nature. By nesting request-response instances, statefullness may be introduced into request-response protocols, and thereby naturally and efficiently support transactions of capabilities coordination, while at the same time preserving existing communication protocols already in place for device-to-device communications of distributed applications.

D. Enhanced Operation Using Nesting

Figure 8:
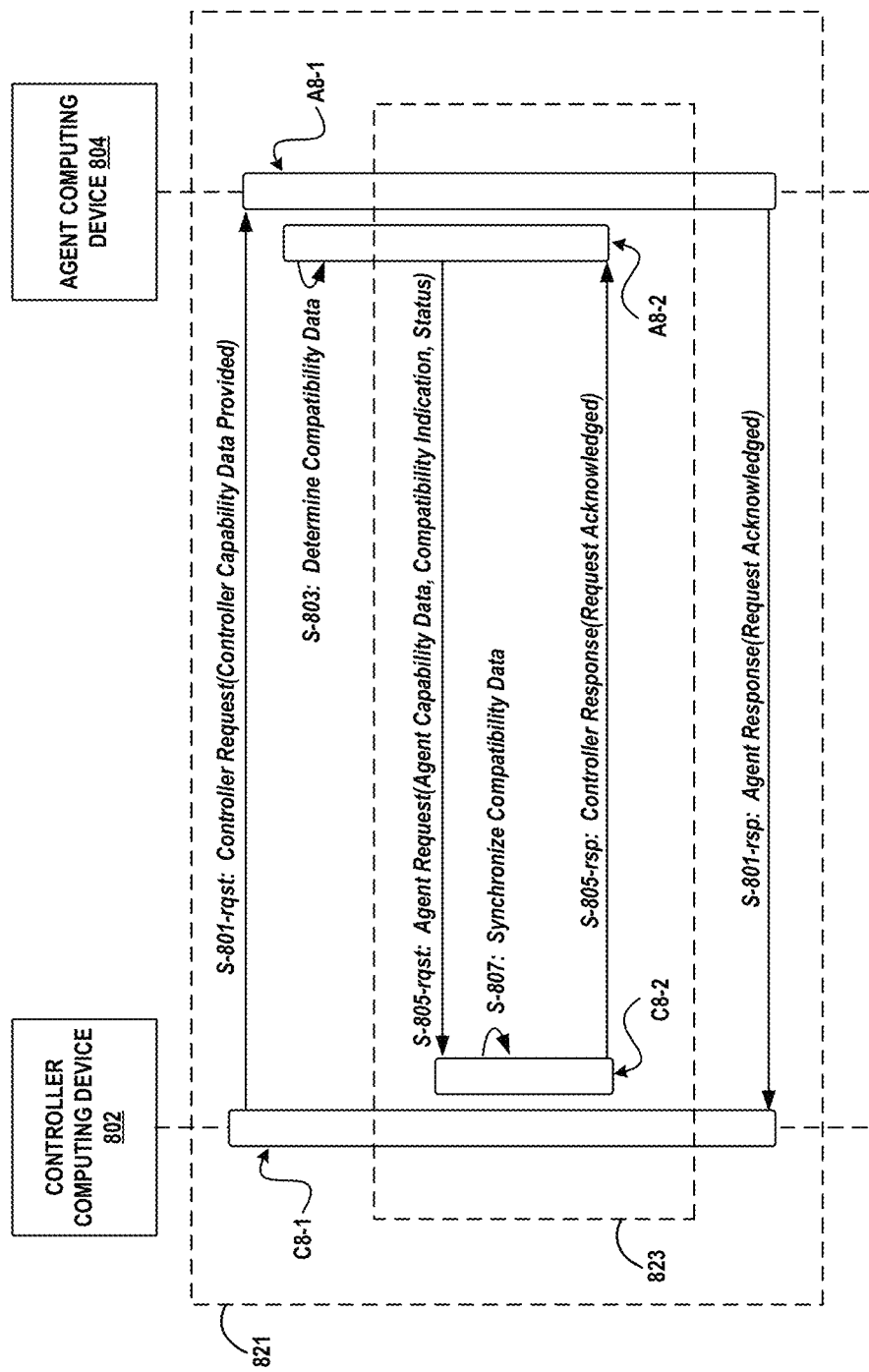
FIG. 8 illustrates an example of nested request-response protocol communications between two example devices, in accordance with example embodiments.

FIG. 8 illustrates an example of nested request-response protocol communications between two example devices, in accordance with example embodiments. As with the illustration in FIG. 7, the example operation in FIG. 8 depicts a message flow diagram, now between a controller computing device 802 and an agent computing device 804. The basic format of FIG. 8 is the same as that of FIG. 7: messages are represented by horizontal arrows between the controller computing devices 802 and 804, with time increasing downward in the figure.

In the example illustrated in FIG. 8, the basic flow of the communications involves just two instances of request-response message pairs, with the one instance pair 823 nested within another instance pair 821. The two instances of a request-response message pairs may be carried out largely concurrently by the respective threads of execution on the two computing devices. Specifically, instance 821 is shown as carried out by thread C8-1 on the controller computing device 802 and thread A8-1 on the agent computing device 804. In nested operation, instance 823 is shown as carried within instance 821 out by thread C8-2 on the controller computing device 702 and thread A8-2 on the agent computing device 804.

In the illustrated example, instance 821 involves the controller computing device 802 sending to the agent computing device 804 a controller request message S-801-rqst, which is a controller request that includes at least some of the controller capability data. Receipt of S-801-rqst at the agent computing device 804 may cause the device to invoke the tread A8-1. This thread may carry one or more operations relating to determination of intersection capabilities, as well as one or more initialization operations, such as selecting compatible capabilities and setting a state of the connection, as described by way of example above. In addition, thread C8-1 execution on the controller computing device 802 may also carry out on one or more initialization and/or state-setting operations.

In contrast to conventional operation, the agent computing device 804 does not immediately send a response to the controller request message S-801-rqst, but rather invokes thread A8-2 concurrently (e.g., in parallel execution with) thread A8-1. Thread A8-2 may then determine compatibility data, such as compatible capability data 605 shown in FIG. 6, at step S-803. Next, thread A8-2 sends an agent request message S-805-rqst. In accordance with example embodiments, agent request message S-805-rqst being sent while a response to the controller request message S-801-rqst is still pending effectively nests agent request message S-805-rqst within what will eventually be the request-response pair initiated by controller request message S-801-rqst. In this way, state is maintained at both the controller computing device 802 and the agent computing device 804 for the duration.

Initiation of a second request-response pair by the agent request message S-805-rqst also corresponds to establishment of the instance pair 823, which is nested within the instance pair 821, as noted.

Receipt of agent request message S-805-rqst at the controller computing device 802 may cause the device to invoke the tread C8-2. This thread may carry one or more operations S-807 to synchronize its capabilities with those of agent computing device 804 reported in the agent request message S-805-rqst. Thread C8-2 may also then send a controller response message S-805-rsp to the agent computing device 804 to acknowledge agent request message S-805-rqst. This confirms synchronization by the controller computing device 802, and may terminate the instance 823 and the threads A8-2 and C8-2 on the agent computing device 804 and the controller computing device 802, respectively.

Having received controller response message S-805-rsp, the agent computing device may then send an agent response message S-801-rsp as an acknowledgement to controller request message S-801-rqst. This confirms synchronization by the agent computing device 804, and may terminate the instance 821 and the threads A8-1 and C8-1 on the agent computing device 804 and the controller computing device 802, respectively.

Implementation with two threads on each of the controller computing device 802 and agent computing device 804 one possible example, and is not intended to be limiting, as other implementations (e.g., single threads) are possible as well. In the example shown, the thread A8-1 could block on actions such as returning a response to the controller request message S-801-rqst and/or carrying out other initialization actions, for example. In other implementations the actions of threads A8-1 and A8-2 could be carried out by a single thread.

In accordance with example embodiments, this nesting approach keeps the first connection established by instance 821 between the controller and agent computing devices 802 and 804 open as long as the second connection established by instance 823 remains open. This, in turn, effectively introduces statefullness throughout the duration of both instances and allows the coordination of capabilities to be carried out in a single, complete transaction. Note that the result of coordination need not necessarily be successful synchronization and/or achievement of compatible capabilities. For example, one or the other of the controller and agent computing devices 802 and 804 (or both) may fail to achieve a state of synchronized capabilities for one reason or another. However, because the entire procedure is carried out within a stateful transaction, any such error state may be discovered as part of the completed transaction, at which point operations relating to failure or error conditions may be invoked. But attempts by either computing device to proceed as if no error has occurred may be avoided or prevented.

For computing devices or systems that communicate using request-response protocols in to carry out distributed applications programs and/or other forms of multi-component application programs configured for operation across two or more computing devices, the nesting technique described by way of example herein enables stateful transactions for those operations that require them. Coordination of capabilities, illustrated herein, is one example of such operations. In view of widespread deployment of distributed application programs and systems, together with the near ubiquitous use of RESTful protocols (e.g., HTTP) for inter-device communications in support of distributed application, the adaptation of these communication protocols to handle stateful transactions provides benefits and advantages both in terms of versatility and flexibility of function, and practicality and feasibility of implementation and deployment.

VI. Example Operations

Figure 9:
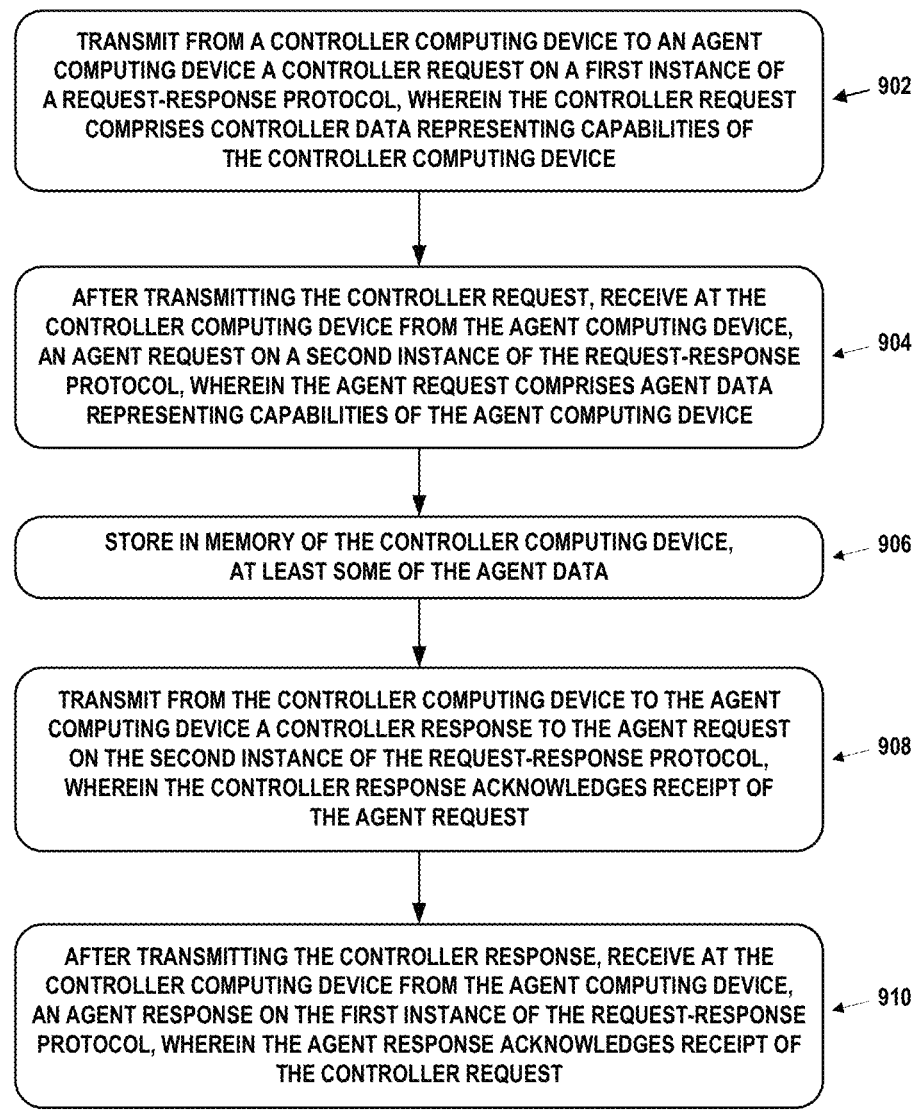
FIG. 9 is a flow chart, in accordance with example embodiments.

FIG. 9 is a flow chart illustrating an example embodiment. The process illustrated by FIG. 9 may be carried out by one or more computing devices, such as computing device 100, and/or a cluster of computing devices, such as server cluster 200. However, the process can be carried out by other types of devices or device subsystems. For example, the process could be carried out by a computational instance of a remote network management platform or a portable computer, such as a laptop or a tablet device.

In accordance with example embodiments, the example method may be implemented as computer-readable instructions stored on or in computer-readable media, such as solid state memory, optical and/or magnetic disk, or other tangible product. In some instances and/or embodiments the computer-readable media may be non-transitory. The computer-readable media may be used for storing the computer-readable instructions in a manner suitable for transport to and installation in or on one or more computing devices. Additionally or alternatively, the computer-readable media may be accessible to one or more processors (e.g., as internal memory) of one or more computing devices, such that the one or more processors may access the instructions and carry out operations in accordance with them. The computer-readable instructions, when executed by one or more processors of one or more computing devices, may cause the one or more computing devices to carry out operations of the example method. As such, the one or more computing devices may be considered to be configured to carry out the example method.

The embodiments of FIG. 9 may be simplified by the removal of any one or more of the features shown therein. Further, these embodiments may be combined with features, aspects, and/or implementations of any of the previous figures or otherwise described herein.

In accordance with example embodiments, the example method illustrated in FIG. 9 may involve a controller computing device communicatively connected with an agent computing device. The connection may be made over a network or other communications system, for example.

At block 902, the example method may involve transmitting from the controller computing device to the agent computing device a controller request on a first instance of a request-response protocol. The controller request may include controller data representing capabilities of the controller computing device. An illustrative and non-limiting example of controller data is controller capability data 601 shown in FIG. 6.

At block 904, the example method may involve, after transmitting the controller request, receiving at the controller computing device from the agent computing device, an agent request on a second instance of the request-response protocol. The agent request may include agent data representing capabilities of the agent computing device.

At block 906, the example method may involve, storing in memory of the controller computing device, at least some of the agent data. An illustrative and non-limiting example of agent data is agent capability data 603, also shown in FIG. 6.

At block 908, the example method may involve, transmitting from the controller computing device to the agent computing device a controller response to the agent request on the second instance of the request-response protocol. The controller response may be considered an acknowledgement of receipt of the agent request, and may thus be in accordance with the request-response protocol.

Finally, at block 910, the example method may involve, after transmitting the controller response, receiving at the controller computing device from the agent computing device, an agent response on the first instance of the request-response protocol. The agent response may be considered an acknowledgement of receipt of the controller request, and may thus also be in accordance with the request-response protocol.

In accordance with example embodiments, the example method may further involve receiving the controller request at the agent computing device and storing at least some of the controller data in memory of the agent computing device. Further operation of the example method may also involve the agent computing device, responsive to receiving the controller request, determining a subset of capabilities of the agent computing device that are compatible and/or synchronized with the capabilities of the controller computing device, and transmitting from the agent computing device to the controller computing device the agent request on the second instance of a request-response protocol. The agent request may further include an indication of the determined subset of capabilities of the agent computing device. An illustrative and non-limiting example of the subset of capabilities of the agent computing device that are compatible and/or synchronized with the capabilities of the controller computing device is the subset of agent capability data in the compatible capability data 605, shown in FIG. 6.

In further accordance with example embodiments, the at least some of the agent data stored in the memory of the controller computing device may include data associated with the determined subset of the capabilities of the agent computing device. Similarly, the at least some of the controller data stored in the memory of the agent computing device may include data associated with a subset of the capabilities of the controller computing device that corresponds to the subset of the capabilities of the agent computing device. An illustrative and non-limiting example of the subset of capabilities of the controller computing device that corresponds to the subset of the capabilities of the agent computing device is the subset of controller capability data in the compatible capability data 605, shown in FIG. 6.

In accordance with example embodiments, the example method may further involve the controller computing device synchronizing with the subset of capabilities of the agent computing device a corresponding subset of the capabilities of the controller computing device. The synchronization may be based on the indication in the agent request.

In accordance with example embodiments, the example method may further involve receiving the controller response at the agent computing device, and after receiving the controller response at the agent computing device, transmitting from the agent computing device to the controller computing device the agent response on the first instance of a request-response protocol.

In accordance with example embodiments, the example method may further involve the controller computing device carrying out operations of the first instance of the request-response protocol on a first controller thread of execution, and carrying out operations of the second instance of the request-response protocol on a second controller thread of execution. Similarly, the example method may still further involve the agent computing device carrying out operations of the first instance of the request-response protocol on a first agent thread of execution, and carrying out operations of the second instance of the request-response protocol on a second agent thread of execution.

In accordance with example embodiment, the request-response protocol may be a communication protocol compliant with and/or modelled on Representational State Transfer (REST). A non-limiting example of such a protocol is HTTP.

VII. Closing

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid-state drive, or another storage medium.

The computer readable medium can also include non-transitory computer readable media such as non-transitory computer readable media that store data for short periods of time like register memory and processor cache. The non-transitory computer readable media can further include non-transitory computer readable media that store program code and/or data for longer periods of time. Thus, the non-transitory computer readable media may include secondary or persistent long-term storage, like ROM, optical or magnetic disks, solid-state drives, or compact disc read only memory (CD-ROM), for example. The non-transitory computer readable media can also be any other volatile or non-volatile storage systems. A non-transitory computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments could include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A controller computing device comprising:
memory containing controller data representing capabilities of the controller computing device; and
one or more processors configured to:
transmit, to an agent computing device, a controller request on a first instance of a request-response protocol, wherein the controller request comprises the controller data;
after transmitting the controller request, receive, from the agent computing device, an agent request on a second instance of the request-response protocol, wherein the agent request comprises agent data representing capabilities of the agent computing device, and wherein the second instance is nested within the first instance, and the first instance remains open for at least as long as the second instance remains nested;

store, in the memory, at least some of the agent data;

transmit, to the agent computing device, a controller response to the agent request on the second instance of the request-response protocol, wherein the controller response acknowledges receipt of the agent request, and wherein the second instance terminates after transmission of the controller response, ending nesting of the second instance within the first instance; and after transmitting the controller response, receive, from the agent computing device, an agent response on the first instance of the request-response protocol, wherein the agent response acknowledges receipt of the controller request, and wherein the first instance terminates after receipt of the agent response.

2. The controller computing device of claim 1, wherein the one or more processors are further configured to:

establish a first thread of execution for operations relating to transmitting the controller request and receiving the agent response; and establish a second thread of execution for operations relating to receiving the agent request and transmitting the controller response.

3. The controller computing device of claim 1, wherein the controller request further comprises an indication to the agent computing device to carry out an agent action relating to the controller data, and wherein the agent request further comprises a status of the agent action.

4. The controller computing device of claim 1, wherein the controller request is configured to cause the agent computing device to determine a subset of the capabilities of the agent computing device that are compatible and/or synchronized with the capabilities of the controller computing device.

5. The controller computing device of claim 1, wherein the agent request further comprises an indication of a subset of the capabilities of the agent computing device that are compatible and/or synchronized with the capabilities of the controller computing device.

6. The controller computing device of claim 5, wherein the at least some of the agent data stored in the memory comprise data associated with the subset of the capabilities of the agent computing device.

7. The controller computing device of claim 5, wherein the one or more processors are further configured to:

based on the indication in the agent request, synchronize and/or make compatible with the subset of the capabilities of the agent computing device a corresponding subset of the capabilities of the controller computing device.

8. An agent computing device comprising:

memory containing agent data representing capabilities of the agent computing device; and one or more processors configured to:

receive, from a controller computing device, a controller request on a first instance of a request-response protocol, wherein the controller request comprises controller data representing capabilities of the controller computing device;

store, in the memory, at least some of the controller data;

after receiving the controller request, transmit, to the controller computing device, an agent request on a second instance of the request-response protocol, wherein the agent request comprises at least some of the agent data, and wherein the second instance is nested within the first instance, and the first instance remains open for at least as long as the second instance remains nested;

receive, from the controller computing device, a controller response to the agent request on the second instance of the request-response protocol, wherein the controller response acknowledges receipt of the agent request, and wherein the second instance terminates after receipt of the controller response, ending nesting of the second instance within the first instance; and after receiving the controller response, transmit, to the controller computing device, an agent response on the first instance of the request-response protocol, wherein the agent response acknowledges receipt of the controller request, and wherein the first instance terminates after transmission of the agent response.

9. The agent computing device of claim 8, wherein the one or more processors are further configured to:

establish a first thread of execution for operations relating to receiving the controller request and transmitting the agent response; and establish a second thread of execution for operations relating to transmitting the agent request and receiving the controller response.

10. The agent computing device of claim 8, wherein the controller request further comprises an indication to the agent computing device to carry out an agent action relating to the controller data, wherein the one or more processors are further configured to carry out the agent action, and wherein the agent request further comprises a status of the agent action.

11. The agent computing device of claim 8, wherein the controller request is configured to cause the agent computing device to determine a subset of the capabilities of the agent computing device that are compatible and/or synchronized with the capabilities of the controller computing device.

12. The agent computing device of claim 8, wherein the agent request further comprises an indication of a subset of the capabilities of the agent computing device that are compatible and/or synchronized with the capabilities of the controller computing device.

13. The agent computing device of claim 12, wherein the at least some of the controller data stored in the memory comprise data associated with a subset of the capabilities of the controller computing device that corresponds to the subset of the capabilities of the agent computing device.

14. The agent computing device of claim 12, wherein the indication in the agent request is configured to cause the controller computing device to synchronize and/or make compatible with the subset of the capabilities of the agent computing device a corresponding subset of the capabilities of the controller computing device.

15. A method comprising:

transmitting from a controller computing device to an agent computing device a controller request on a first instance of a request-response protocol, wherein the controller request comprises controller data representing capabilities of the controller computing device;

after transmitting the controller request, receiving at the controller computing device from the agent computing device, an agent request on a second instance of the request-response protocol, wherein the agent request comprises agent data representing capabilities of the agent computing device, and wherein the second instance is nested within the first instance, and the first instance remains open for at least as long as the second instance remains nested;

storing in memory of the controller computing device, at least some of the agent data;

transmitting from the controller computing device to the agent computing device a controller response to the agent request on the second instance of the request-response protocol, wherein the controller response acknowledges receipt of the agent request, and wherein the second instance terminates after the transmitting of the controller response, ending nesting of the second instance within the first instance; and after transmitting the controller response, receiving at the controller computing device from the agent computing device, an agent response on the first instance of the request-response protocol, wherein the agent response acknowledges receipt of the controller request, and wherein the first instance terminates after the receiving of the agent response.

16. The method of claim 15, further comprising:

receiving the controller request at the agent computing device;

storing in memory of the agent computing device, at least some of the controller data;

responsive to receiving the controller request, the agent computing device determining a subset of capabilities of the agent computing device that are compatible and/or synchronized with the capabilities of the controller computing device; and transmitting from the agent computing device to the controller computing device the agent request on the second instance of a request-response protocol, wherein the agent request further comprises an indication of the determined subset of capabilities of the agent computing device.

17. The method of claim 16, wherein the at least some of the agent data stored in the memory of the controller computing device comprise data associated with the determined subset of the capabilities of the agent computing device, and wherein the at least some of the controller data stored in the memory of the agent computing device comprise data associated with a subset of the capabilities of the controller computing device that corresponds to the subset of the capabilities of the agent computing device, and wherein the method further comprises:

the controller computing device, based on the indication in the agent request, synchronizing with the subset of capabilities of the agent computing device a corresponding subset of the capabilities of the controller computing device.

18. The method of claim 15, further comprising:

receiving the controller response at the agent computing device; and after receiving the controller response at the agent computing device, transmitting from the agent computing device to the controller computing device the agent response on the first instance of a request-response protocol.

19. The method of claim 15, further comprising:

the controller computing device carrying out operations of the first instance of the request-response protocol on a first controller thread of execution, and carrying out operations of the second instance of the request-response protocol on a second controller thread of execution; and the agent computing device carrying out operations of the first instance of the request-response protocol on a first agent thread of execution, and carrying out operations of the second instance of the request-response protocol on a second agent thread of execution.

20. The method of claim 15, wherein the request-response protocol comprises a communication protocol compliant with and/or modelled on Representational State Transfer (REST).

* * * * *